United States Patent [19]
Barnes et al.

[11] Patent Number: 5,263,199
[45] Date of Patent: Nov. 16, 1993

[54] VEHICLE ACCESSORY HAVING INTEGRALLY CONTAINED RADIO RECEIVER AND RECORDING MEANS

[75] Inventors: Ronald P. Barnes, 8212 Bell Mill Rd., Ooletwah, Tenn. 37363; David O. Hanon, Ringold, Ga.

[73] Assignee: Ronald P. Barnes, Ooltewah, Tenn.

[21] Appl. No.: 668,880

[22] Filed: Mar. 13, 1991

[51] Int. Cl.[5] .............................................. H04B 1/06
[52] U.S. Cl. ................... 455/344; 455/345; 381/86; 369/7; 360/137
[58] Field of Search ............... 455/344, 345, 166.2; 381/86, 91; 369/7, 10; 360/137

[56] References Cited

U.S. PATENT DOCUMENTS

| | | | |
|---|---|---|---|
| 4,109,115 | 8/1978 | Yamamoto | 369/10 |
| 4,713,801 | 12/1987 | Hale | 369/7 |
| 4,905,270 | 2/1990 | Ono | 455/90 |

OTHER PUBLICATIONS

Audio Singing Machine Recorder Rhapsody Catalog Jun., 1989.

Primary Examiner—Reinhard J. Eisenzopf
Assistant Examiner—Almaz Woldu
Attorney, Agent, or Firm—Bell, Seltzer, Park & Gibson

[57] ABSTRACT

A vehicle accessory is disclosed which includes a housing configured for mounting within the passenger compartment of a vehicle and further configured for electrical connection to a vehicle radio antenna. A radio receiver and recorder are contained within the housing. The recorder selectively receives radio broadcasts and records radio broadcasts onto the media. An electronic control controls operation of the radio receiver and recorder for recording radio broadcasts while simultaneously recording sound emitted onto a recorder microphone. A speech generator is operatively connected to the recorder and to a plurality of preset buttons for generating a predetermined audio message onto the media contained within the housing. The controller activates the speech generator in response to a predetermined occurrence for recording a generated audio message onto a media contained within the housing after manual activation of the recorder and depression of a preset button.

21 Claims, 6 Drawing Sheets

VEHICLE ACCESSORY HAVING INTEGRALLY CONTAINED RADIO RECEIVER AND RECORDING MEANS

FIELD OF THE INVENTION

This invention relates to a vehicle accessory and more particularly to a vehicle radio receiver.

BACKGROUND OF THE INVENTION

The automobile is an important part of life. Because commuters, salesmen, managers, and business executives sometimes spend hours each day in an automobile or other vehicle, cellular telephones and hand-held dictaphones have become popular accessories for making time spent in an automobile more productive. Hand-held dictaphones come in many sizes and are advantageous because they can be carried in attaché cases as well as the pockets of many suit jackets. If a driver is skilled, one hand can be used for holding the steering wheel and driving, while the other hand manually activates a hand-held dictaphone for recording messages and other memoranda or documentation.

In one prior art teaching, U.S. Pat. No. 4,064,374, a separate hand-held cassette recorder is detachably coupled to a receptacle pocket of a car radio for allowing playback of recorded messages, music or dictation through the radio speaker, and for allowing recording directly from the radio onto the tape. When a driver desires to dictate, the driver removes the tape player from the receptacle pocket of the radio and manually activates the tape recorder portion to initiate dictation. This prior art proposal suffers some drawbacks. The separate manipulation of a hand-held tape player is inconvenient to a driver and lessens driver attention to the road. Additionally, the tape recorder includes numerous operating buttons which have to be operated when recording and dictating making operation of the tape recorder difficult.

A vehicle accessory having a tape recorder and radio receiver integrally connected to each other and contained in one housing would be advantageous because a housing containing the tape recorder can be configured for mounting within the passenger compartment of the vehicle and connected to the vehicle radio antenna. Additionally, in this type of vehicle accessory, it would be advantageous to record directly from the radio receiver while dictating for dampening the background sounds present in a vehicle. Also, any combination radio-recorder should offer ease of operation and minimize manual manipulation of various buttons on the tape recorder.

SUMMARY OF THE INVENTION

Heretofore it has not been proposed to provide a tape recorder or other recording means integrally connected to a radio receiver where both the radio receiver and recording means are contained within one housing and configured for mounting within the passenger compartment of a vehicle.

The following invention provides a vehicle accessory having a radio receiver and recording means which does not require coupling of a separate hand-held tape recorder to the radio receiver as in prior art proposals.

The vehicle accessory comprises a housing which is configured for mounting within the passenger compartment of a vehicle and which is further configured for electrical connection to a vehicle radio antenna. A radio receiver is contained within the housing for receiving radio broadcasts via the vehicle radio antenna. Recording means also is contained within the housing for recording information on a media contained within the housing. An audio output is adapted for connection to speakers, and the radio receiver and recording means are operatively connected to the audio output. The recording means includes means for allowing playback of information stored onto the media contained within the housing. The recording means includes a microphone for receiving sound and recording the sounds on a media contained within the housing. The housing includes an exposed front panel when the vehicle accessory is mounted in the passenger compartment. In one embodiment the microphone is positioned on the front panel. Another embodiment includes means for mounting the microphone in a remote location of the passenger compartment such as a sunshade.

In one embodiment, the recording means includes means operatively connected to the radio receiver for receiving radio broadcasts and recording the radio broadcasts onto the media contained within the housing. Electronic control means, in the preferred form of a microprocessor, is operatively connected to the radio receiver and the recording means for recording radio broadcasts while simultaneously recording sound emitted onto the microphone. The recording of background music is advantageous during dictating or other recording to "muffle" or disguise background noise normally present in a vehicle compartment during driving. A speech generator also can be operatively connected to the electronic control and recording means for generating an audio message. The speech generator can be enabled in response to a predetermined occurrence for recording the audio message on the media contained within the housing.

In another embodiment, the exposed front panel of the housing includes a plurality of preset buttons positioned on the front panel and operatively connected to the radio receiver. The individual preset buttons correspond to preselected tuned radio frequencies so that upon depression of a selected preset button, a preselected radio frequency is tuned. Speech generating means is operatively connected to the recording means and the preset buttons for generating a predetermined audio message onto the media contained within the housing upon depression of a selected preset button.

Manually activated selection means is mounted on the front panel for selecting operation of the recording means for recording sound received by the microphone. Electronic control means is operatively connected to the recording means, the speech generating means, manually activated selection means and the plurality of preset buttons. The electronic control means comprises first means for activating the recorder means for recording information or sound onto the media contained within the housing after manual activation of the selection means; and second means for activating the speech generating means for recording the generated audio message onto the media contained within the housing after manual activation of the selection means and the depression of a preset button.

Preferably, the preset buttons are sequentially arranged in ascending whole numbers starting with the numeral one. The audio message comprises the word "take" followed by a whole number corresponding to the whole number sequence of the preset button which was pushed. The control means also advantageously comprises third means for selectively activating the radio receiver for recording radio broadcasts onto the media contained within the housing.

BRIEF DESCRIPTION OF THE DRAWINGS

Some of the objects and advantages of the present invention having been stated, others will become apparent by reference to the following drawings, in which.

DETAILED DESCRIPTION OF THE DRAWINGS

Figure 1:
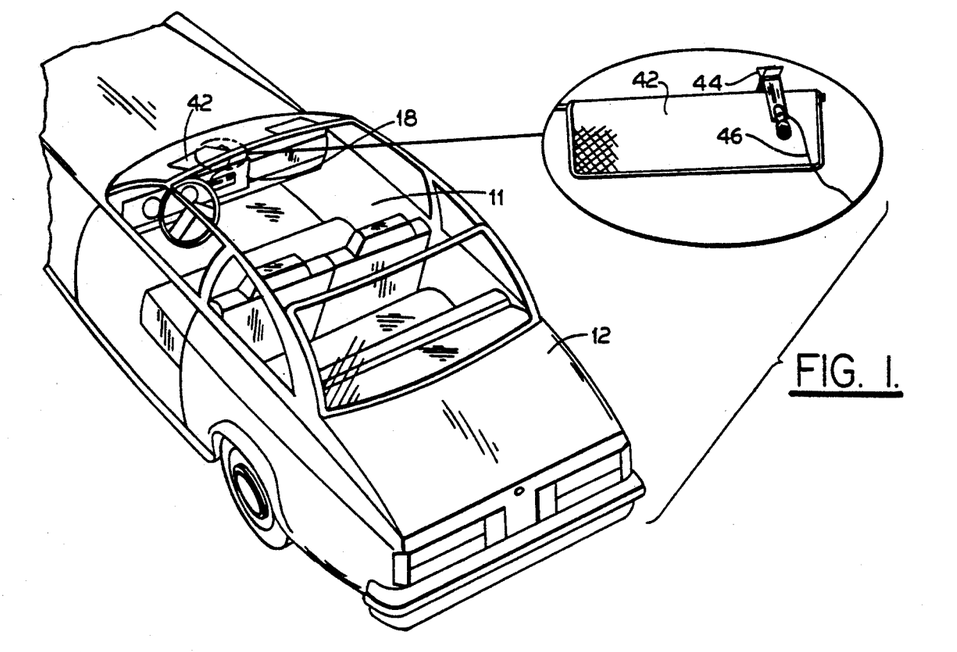
FIG. 1 is an isometric view of a vehicle showing the interior passenger compartment and showing the vehicle accessory in accordance with the present invention mounted therein.
Figure 2:
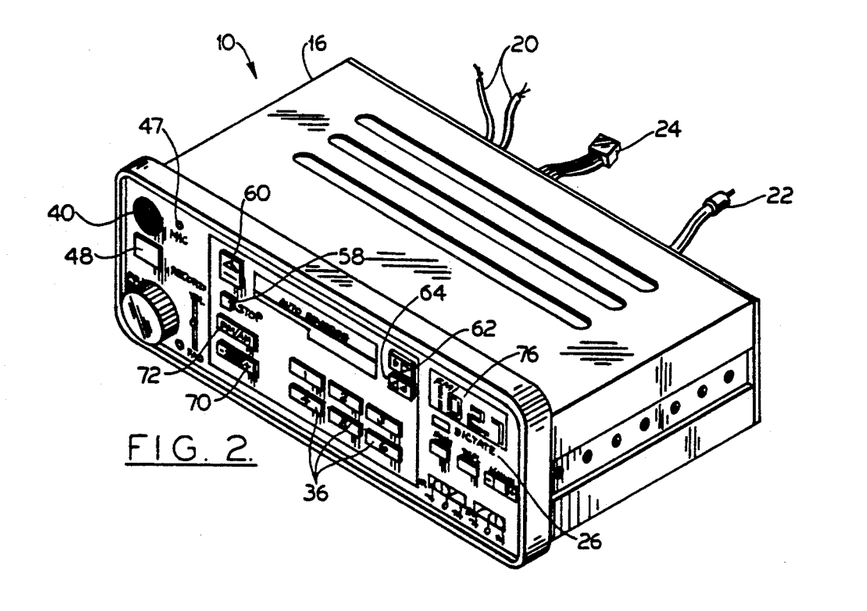
FIG. 2 is an isometric view of the vehicle accessory in accordance with one embodiment of the present invention.

Referring now to the drawings, and more particularly to FIG. 1, there is illustrated generally at 10, a vehicle accessory in accordance with one embodiment of the present invention which is mounted within the passenger compartment 11 of a vehicle 12, illustrated as a passenger car. As shown in FIG. 2, the vehicle accessory 10 is similar in general structure and appearance to a conventional AM/FM combination automobile stereo and cassette player. The vehicle accessory 10 includes a housing 16 which is configured for mounting within or under the central dash 18 of the passenger compartment 11 of the vehicle 12, similar to other AM/FM and cassette player automobile stereos adapted for mounting within or under the central dash 18 of the vehicle. The vehicle accessory 10 includes the conventional coupling jacks and connection wires, such as the two power leads 20 for connection to a twelve volt source of power, the antenna coupling connector 22, and the unitary plug-in receptacle 24 interconnecting the accessory audio output with the vehicle speakers.

The housing 16 has an exposed front panel 26 (FIGS. 2 and 5) when the vehicle accessory 10 is mounted in the passenger compartment 11. The front panel 26 includes a plurality of controls normally found with most AM/FM and cassette automobile stereos and functions as a control panel for operating the conventional AM/FM radio receiver tuner portion and the cassette player. Additionally, the front panel 26 includes other controls as will be explained later for operating the vehicle accessory in accordance with the present invention.

Figure 3:
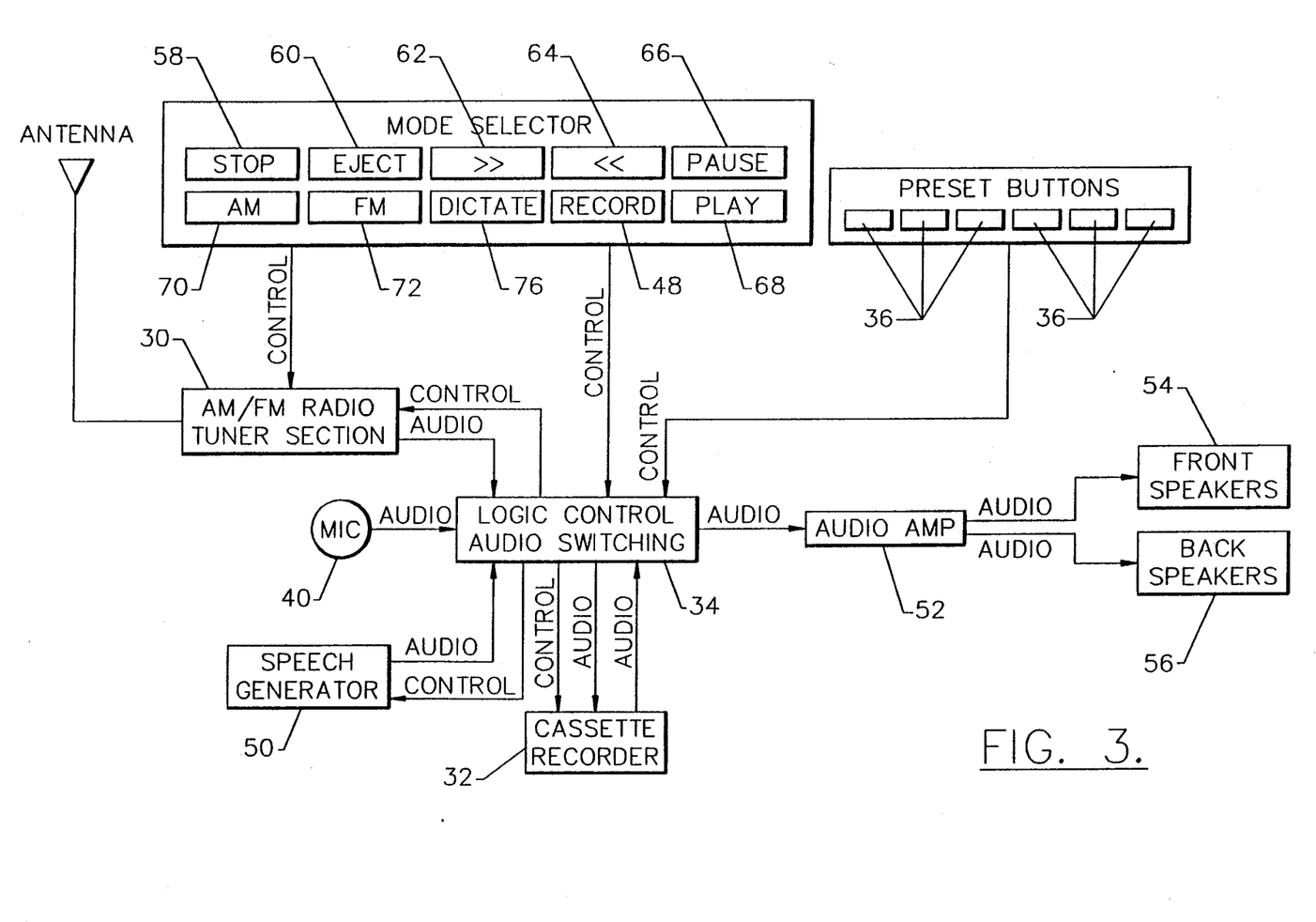
FIG. 3 is a schematic block diagram of the vehicle accessory in accordance with one embodiment of the present invention.

Referring now to FIG. 3, there is shown a schematic block diagram illustrating the major components of the vehicle accessory 10 and their interconnection. The vehicle accessory 10 includes the normal components of an automotive AM/FM radio receiver tuner indicated at block 30. Recording means in the form of a cassette player and recorder is indicated at block 32. Both the AM/FM radio receiver tuner 30 and the cassette player and recorder 32 are mounted within the housing 16 to form an integral unit as illustrated in FIG. 2. It is understood that other recording means such as a recordable compact disc can be used.

The AM/FM radio receiver tuner 30 and cassette player and recorder 32 are operatively interconnected to each other and to the controls positioned on the front panel of the vehicle accessory. Control means illustrated at block 34, also referred to as the logic control audio switching hardware, controls operation of the vehicle accessory 10 as illustrated in FIG. 3. As will be understood by those skilled in the art, a large number of different microprocessor circuits and other electronic controls can be used for operating and controlling the functions of the AM/FM radio receiver tuner 30, the cassette player and recorder 32 and other hardware in accordance with the present invention. A one chip microprocessor such as MC68HC11A1 produced by Motorola is acceptable for use with the present invention.

Figure 5:
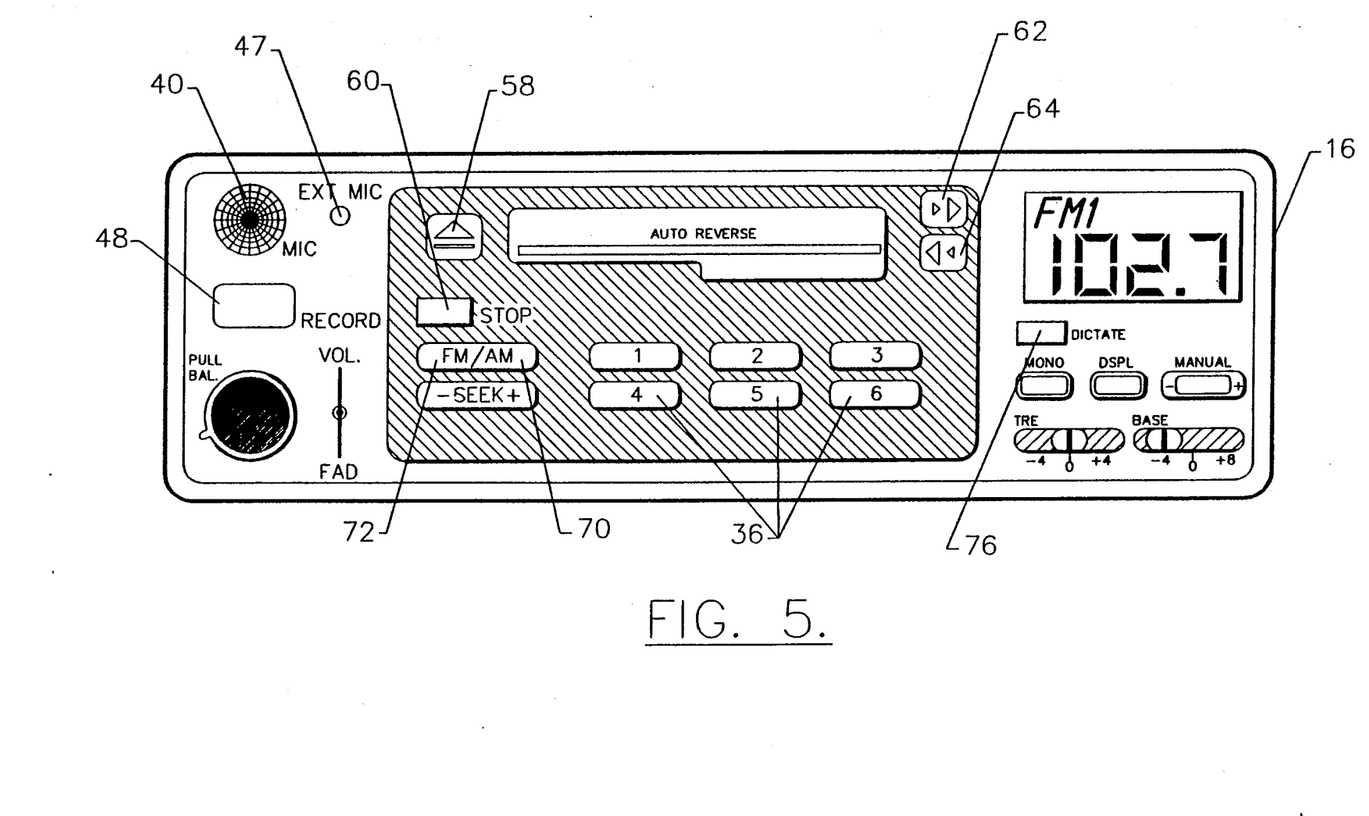
FIG. 5 is a front elevation view of the exposed front panel of the housing.

A plurality of preset buttons 36 are positioned on the front panel 26 and are operatively connected to the AM/FM radio receiver tuner 30 (FIGS. 2, 3 and 5). The individual preset buttons 36 correspond to preselected tuned radio frequencies so that upon depression of a selected preset button when the radio receiver tuner 30 is in operation, the controller preselects a desired radio frequency.

The cassette recorder and player 32 includes a microphone 46 for receiving sound and recording the sound on the media contained in the housing, i.e, the cassette tape. As will be explained later, the microphone 40 allows dictation or other recording. In FIGS. 2 and 5, the microphone 40 is positioned on the front panel 26. In another embodiment, the microphone 40 is separate from the housing 16 and includes means for mounting the microphone 40 in a remote location of the passenger compartment 11 such as the sunshade 42 (FIG. 1). In the illustrated embodiment, the mounting means includes a clip 44 used to mount the microphone 40 on the sunshade 42. A microphone cable 46 interconnects the microphone 40 to the controller 34 and cassette player and recorder 32 via a separate connection jack 47 (FIG. 5). Thus, the microphone 40 can be conveniently located at a desired location in the vehicle, facilitating dictation for a driver.

Additionally, the logic control and audio switching hardware of the controller 34 operatively interconnects the radio receiver tuner 30 and cassette player and recorder 32 to allow recording of radio broadcasts onto the cassette tape contained within the housing 16. Manually activated radio record selection means in the form of a record button 48 is mounted on the front panel (FIGS. 3 and 5) for selecting operation of the cassette player and recorder 32 for recording radio broadcasts onto the media, i.e. cassette tape contained in the housing 16, when the radio receiver tuner 30 is in operation. When the record button 48 is depressed as the radio receiver tuner 30 operates, the radio broadcasts are recorded.

Speech generating means preferably in the form of a digital speech generator, indicated at block 50, is operatively connected to the cassette player and recorder 32 for generating a predetermined audio message onto the cassette contained within the housing 16 in response to a predetermined occurrence. A speech generator manufactured by NEC under model number UPD7756C is acceptable for use or speech could be stored in a ROM chip and could be played back by use of a digital to analog converter chip under the control of the microprocessor chip as mentioned before, providing a "natural" humanlike sound.

In a preferred embodiment, the speech generator 50 is operatively connected through the controller 34 to the preset buttons 36, so that the predetermined occurrence includes depression of one of the preset buttons (FIG. 3). The preset buttons 36 are sequentially arranged in ascending whole numbers starting with the numeral one. The audio message comprises the word "take" followed by a number corresponding to the whole number sequence of the preset button 36 which was pushed. Thus, during dictation, a predetermined audio message such as "Take One" or "Take Two" can be recorded before dictating a desired message.

Other major hardware components of the vehicle accessory 10 include an audio amplifier output indicated at block 52, and adapted for connection to speakers, such as conventional front and rear automobile speakers indicated generally at blocks 54 and 56. The other mode selectors indicated on the control panel of FIG. 3 include the conventional stop 58, eject 60, fast forward 62, rewind 64, pause 66, play 68 and AM 70 and FM 72 select modes. These modes are selected by conventional push buttons as illustrated in FIGS. 2 and 5. A separate dictation mode button 76 selects operation of the cassette player and recorder 32 for allowing recording of sounds, such as dictation, emitted onto the microphone 40. The play button 68 is optional. As in many car stereo cassette players, the play mode is activated when the tape is inserted into the car stereo cassette player.

Figures 4, 4A:
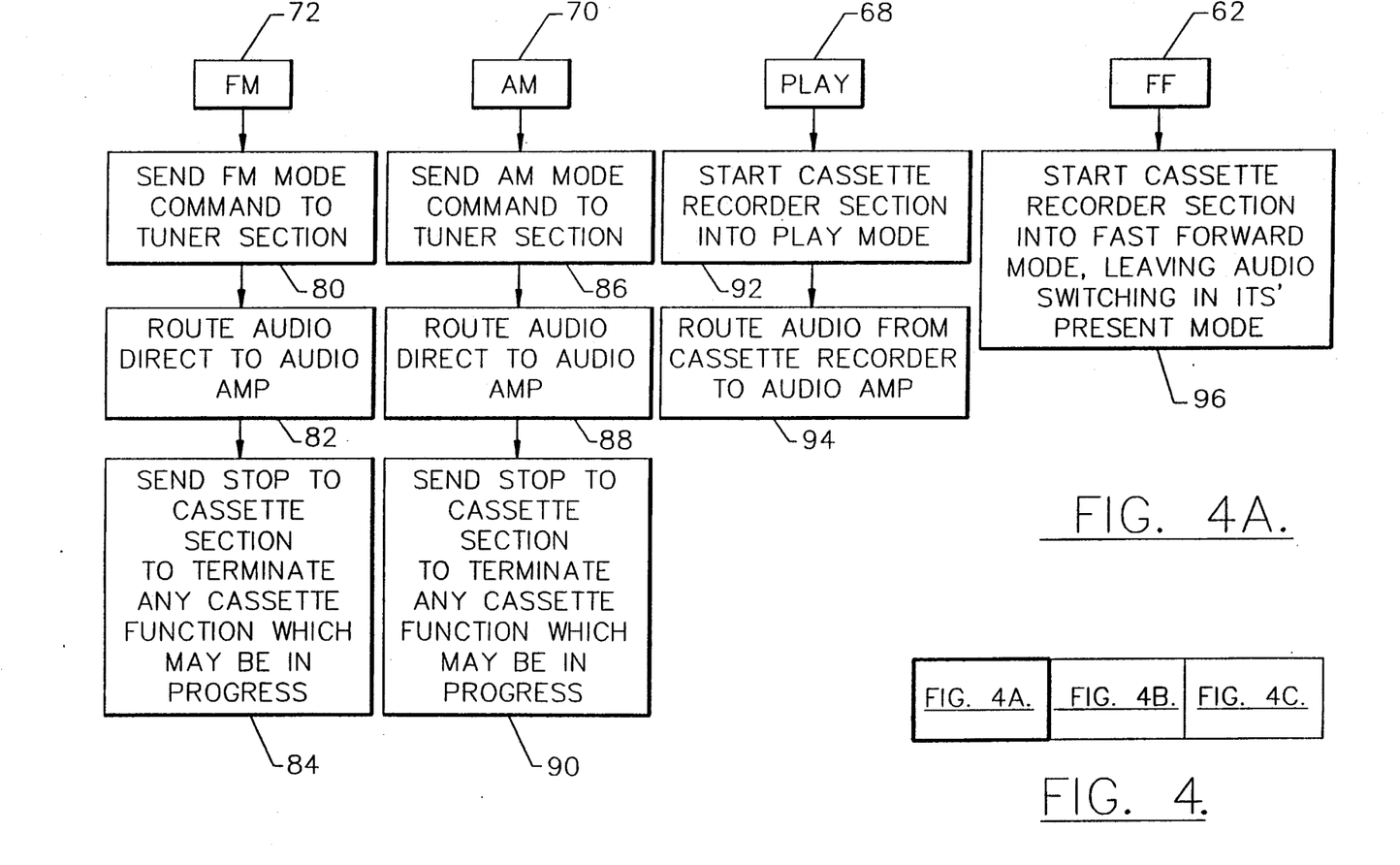
FIGS. 4a-4c are a flow chart representative of the operation of the electronic control means in accordance with one embodiment of the present invention.
Figures 4, 4B:
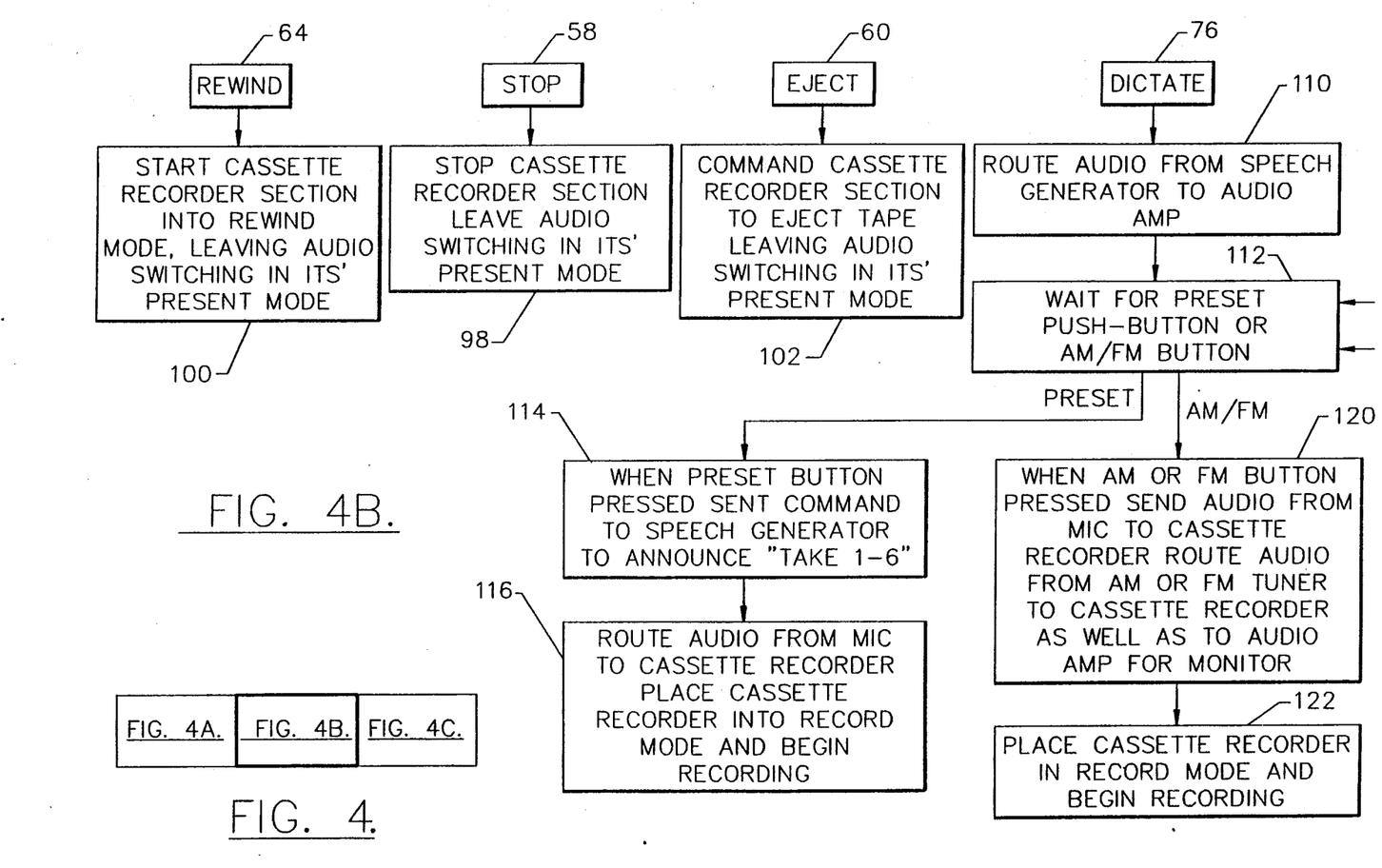
Figures 4, 4C:
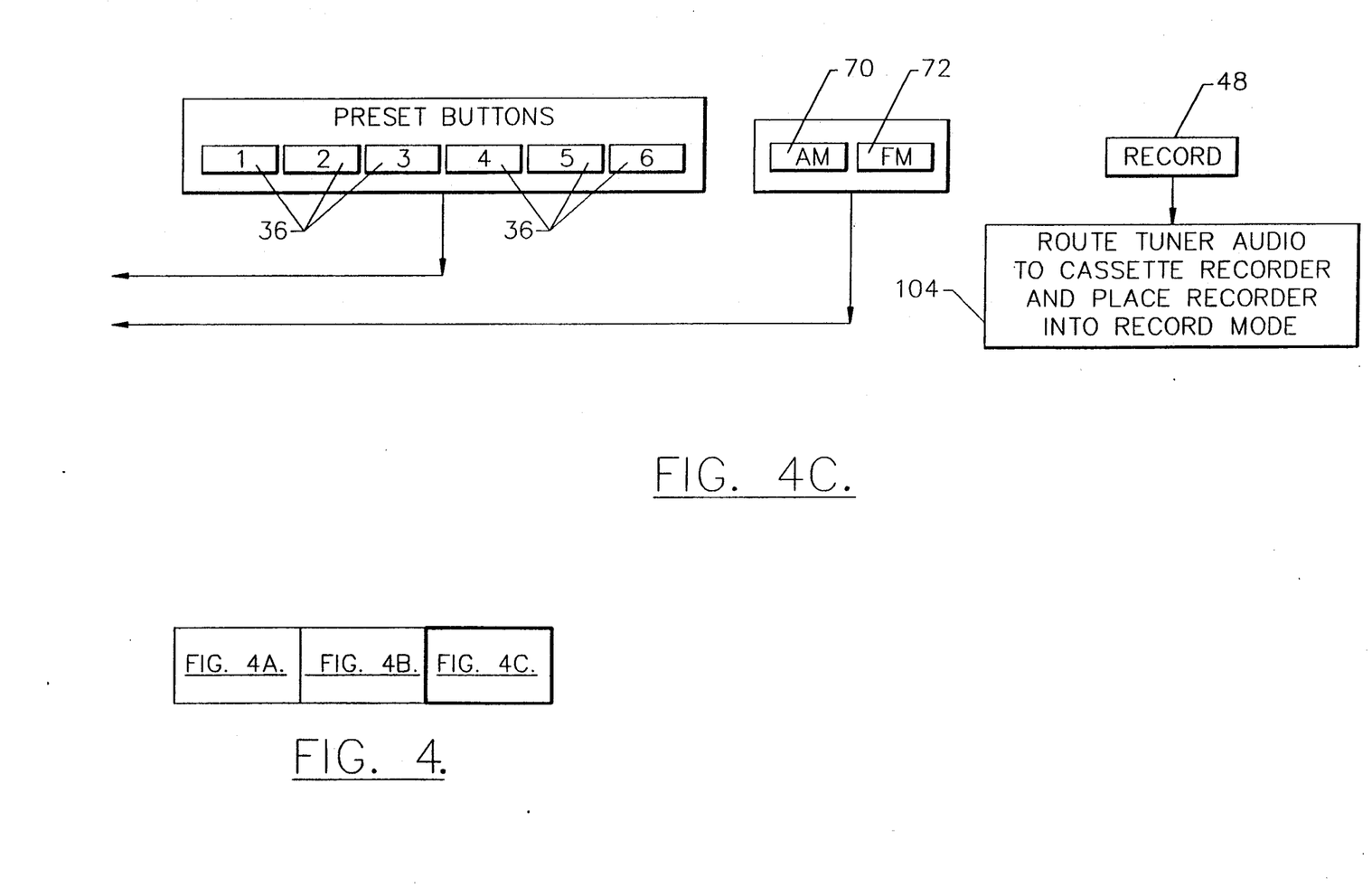

Referring now to FIG. 4, there is illustrated a flow chart of the operation of the controller 34 in accordance with a preferred embodiment of the present invention. As illustrated, the controller 34 functions similar to the controller of a conventional AM/FM-cassette player when either the AM-FM 70, 72, play 68, fast forward (ff) 62, rewind 64, stop 58 or eject 60 buttons are pushed. When the FM button 72 is pushed, the controller 34 sends an FM mode command to the radio receiver tuner, indicated at block 80, and the FM audio is routed direct to the audio amplifier as indicated at block 82. If the cassette player and recorder 32 is in operation, an interrupt signal is transmitted to the cassette player and recorder to terminate any cassette function which may be in progress as indicated at block 84. Similarly, when the AM button is pushed, the controller 34 sends an AM mode command to the radio receiver tuner as indicated at block 86 and the AM audio is routed direct to the audio amplifier, block 88. If the cassette player and recorder 32 is in operation, an interrupt signal is sent to the cassette to terminate any cassette function which may be in progress, block 90.

When the play button 68 is pushed, the controller 34 actuates the cassette player and recorder 32 into a play mode, block 92. The audio is routed from the cassette player to the audio amplifier and any dictation, music or other information stored on the cassette is routed to the audio amplifier and through the speakers, block 94. Depression of the fast forward button 62 moves the cassette player and recorder 32 into fast forward mode, block 96. The controller, i.e. audio switching hardware remains in this mode until the stop button 58 is depressed, block 98. If the rewind button 64 is pushed, the cassette recorder is moved into rewind mode to allow rewinding of the tape, block 100. Depression of the stop button terminates rewinding. The eject button 60 commands the cassette player and recorder 32 to eject the cassette tape, block 102. During operation in either the AM or FM mode, one of the preset buttons 36 can be pushed corresponding to a preselected tuned radio frequency so that a preselected radio frequency is tuned. In accordance with the present invention, depression of the record button 48 places the cassette player and recorder 32 into a record mode, block 104, and allows straight recording from either FM or AM directly onto the cassette tape contained in the housing 16. This record mode function is advantageous because desired radio programs can be recorded.

In accordance with the present invention, when the dictate button 76 is pushed, the speech generator is enabled for generating digitized speech to the audio output, block 110. At this time, either the preset push buttons or one of the AM/FM mode selection buttons is pushed, block 112. When a preset button is pushed, the controller 34 activates the speech generator 50 to generate the word "take" followed by the whole number corresponding to the whole number sequence of the preset button 36 which was pushed, block 114. At the same time, the controller 34 places the cassette player and recorder 32 in record mode and the audio is routed from the microphone to the cassette player and recorder which begins recording the audio sounds, i.e. dictation emitted onto the microphone, block 116. Another preset button can be pushed and a second "take" is initiated.

On the other hand, if the AM or FM mode select button 70, 72 is pushed instead of a desired preset button 36, not only is the audio from the microphone 40 transmitted to the cassette player and recorder 32, but radio audio is routed from the AM or FM to the cassette recorder. Additionally, audio is routed direct to the audio amplifier and the speakers for monitoring the sound level of the recorded AM or FM, block 120. The controller 34 automatically sets the tape player and recorder 32 into the record mode, block 122.

The present invention offers several benefits. First, the vehicle accessory in accordance with the present invention offers ease of operation and minimizes manual manipulation of various operating buttons on the cassette player and recorder. A driver can dictate as necessary while maintaining close control on the vehicle. The "no-hands" operation is advantageous because the driver does not have to hold a dictation button when dictating. Different sequences of dictated messages can be recorded at the touch of a preselect button which activates the speech generator for recording a series of "Takes." Thus, the speech generator and sequential "Takes" facilitate the recording of multiple messages. Music also can be recorded in the background while dictating to dampen the background noise normally present in a vehicle traveling on a road. During only AM or FM mode operation, recording of radio broadcasts is possible by pushing the record button.

In the drawings and specification, there have been disclosed typical preferred embodiments in the invention, and although specific terms are employed, they are used in a generic and descriptive sense, not for purposes of limitation. Thus, it will be recognized that numerous variations can be made within the spirit and scope of the invention as described in the forgoing specification and defined in the following claims.

That which is claimed is:

1. A vehicle accessory comprising:
   a housing, configured for mounting within the passenger compartment of a vehicle, and further configured for electrical connection to a vehicle radio antenna;

a radio receiver, fixedly contained within said housing, for receiving radio broadcasts via the vehicle radio antenna;

recording means, fixedly contained within said housing, for recording information on a media contained within the housing;

voice generating means mounted in said housing for generating an audio message, and electronic control means operatively connected to said recording means and said voice generating means for enabling operation of said voice generating means and said recording means in response to a predetermined occurrence for recording said audio message on a media contained within said housing.

2. A vehicle accessory according to claim 1 including an audio output adapted for connection to speakers, and wherein said radio receiver and recording means are operatively connected to said audio output.

3. A vehicle accessory according to claim 1 wherein said recording means includes means for allowing playback of information stored onto a media contained within said housing.

4. A vehicle accessory according to claim 1 wherein said recording means is operatively connected to said radio receiver and said recording means includes means for receiving radio broadcasts for recording radio broadcasts onto a media contained within said housing.

5. A vehicle accessory according to claim 1 wherein said recording means includes a microphone for receiving sound and recording the sounds on a media contained within said housing.

6. A vehicle accessory according to claim 5 wherein said housing includes an exposed front panel when said vehicle accessory is mounted in the passenger compartment, and wherein said microphone is positioned on said front panel.

7. A vehicle accessory according to claim 5 wherein said microphone includes means for mounting said microphone in a remote location of the passenger compartment such as a sunshade.

8. A vehicle accessory according to claim 1 wherein said control means is a microprocessor.

9. A vehicle accessory according to claim 1 including a plurality of preset buttons, wherein said predetermined occurrence includes depression of one of said preset buttons.

10. A vehicle accessory according to claim 9 wherein said preset buttons are sequentially arranged in ascending whole numbers starting with the numeral one, and said audio message comprises the word "take" followed by a number corresponding to the whole number sequence of the preset button which is pushed.

11. A vehicle accessory comprising:
a housing, configured for mounting within the passenger compartment of a vehicle, and further configured for electrical connection to a vehicle antenna, said housing having an exposed front panel when the radio receiver is mounted in the passenger compartment, a radio receiver contained within said housing for receiving radio broadcasts from the vehicle antenna, a plurality of preset buttons positioned on said front panel and operatively connected to said radio receiver, wherein individual preset buttons correspond to preselected tuned radio frequencies so that upon depression of a selected preset button, a preselected radio frequency is tuned, recording means contained within said housing for recording information on a media contained within said housing, said recording means including a microphone for receiving sound and recording the sound onto the media contained within the housing, manually activated selection means mounted on said front panel for selecting operation of said recording means for recording sound received onto said microphone, speech generating means operatively connected to said recording means and preset buttons for generating a predetermined audio message onto the media contained within said housing, and electronic control means operatively connected to said recording means, said speech generating means, said manually activated selection means and said plurality of preset buttons, said control means comprising first means for activating said recording means for recording sound on a media contained within said housing after manual activation of said selection means, and second means for activating said speech generating means for recording said generated audio message onto a media contained within said housing after manual activation of said selection means and depression of a preset button.

12. A vehicle accessory according to claim 11 wherein said preset buttons are sequentially arranged in ascending whole numbers starting with the numeral one, and said audio message comprises the word "take" followed by a whole number corresponding to the whole number sequence of the preset button which was pushed.

13. A vehicle accessory according to claim 11 including an audio output adapted for connection to speakers, and wherein said radio receiver and recording means are operatively connected to said audio output.

14. A vehicle accessory according to claim 11 wherein said recording means includes means for contained within said housing.

15. A vehicle accessory according to claim 11 wherein said electronic control means is a microprocessor.

16. A vehicle accessory according to claim 11 wherein said microphone includes means for mounting said microphone in a remote location of the passenger compartment such as the sunshade.

17. A vehicle accessory comprising:
a housing configured for mounting within the passenger compartment of a vehicle, and further configured for electrical connection to a vehicle antenna, said housing having an exposed front panel when the radio receiver is mounted in the passenger compartment, a radio receiver contained within said housing for receiving radio broadcasts via a vehicle antenna, a plurality of preset buttons positioned on said front panel and operatively connected to said radio receiver, wherein individual preset buttons correspond to preselected tuned rad:,o frequencies so that upon depression of a selected preset button, a preselected radio frequency is tuned, recording means contained within said housing for recording information on a media contained within said housing, said recording means including a microphone for receiving sound and recording the sound on the media, and including means operatively connected to said radio receiver for recording radio broadcasts onto the media contained within the housing, manually activated selection means mounted on said front panel for selecting operation of said recording means for recording sound received onto said microphone, speech generating means operatively connected to said recording means and preset buttons for generating a predetermined audio message onto the media contained within said housing, manually activated radio selection means mounted on said housing for selecting operation of said radio receiver, and electronic control means operatively connected to said recording means, said speech generating means, said manually activated selection means, said manually activated radio selection means and said plurality of preset buttons, said electronic control means comprising first means for activating said recording means for recording sound on a media contained within said housing after manual activation of said selection means, second means for selectively activating said speech generating means for recording said generated audio message onto a media contained within said housing after selective manual activation of said selection means and selective depression of a preset button, and third means for selectively activating said radio receiver for recording radio broadcasts on a media contained within said housing after manual activation of said selection means followed by selective manual activation of said radio selection means.

18. A vehicle accessory according to claim 17 including an audio output adapted for connection to speakers, and wherein said radio receiver and recording means are operatively connected to said audio output.

19. A vehicle accessory according to claim 17 wherein said recording means includes means for allowing playback of information stored onto a media contained within said housing.

20. A vehicle accessory according to claim 17 wherein said microphone includes means for mounting said microphone in a remote location of the passenger compartment such as a sunshade.

21. A vehicle accessory according to claim 17 wherein said electronic control means is a microprocessor.

* * * * *

UNITED STATES PATENT AND TRADEMARK OFFICE
CERTIFICATE OF CORRECTION

PATENT NO. : 5,263,199
DATED : November 16, 1993
INVENTOR(S) : Barnes et al.

It is certified that error appears in the above-identified patent and that said Letters Patent is hereby corrected as shown below:

Title page, item [56] References Cited under the
U.S. PATENTS DOCUMENTS:

Add the following references:

| | | |
|---|---|---|
| 3,646,278 | 02/29/72 | Panizzi |
| 3,916,122 | 10/28/75 | Sato et al |
| 4,064,374 | 12/20/77 | Sato |
| 4,120,037 | 10/10/78 | Sato |
| 4,389,716 | 06/21/83 | Pearson |
| 4,542,490 | 9/17/85 | Shimizu et al |

Column 8, line 43, after "for" insert --allowing playback of information stored onto a media--.

Column 8, line 64, "rad:,o" should be --radio--.

Signed and Sealed this

Twenty-eighth Day of June, 1994

Attest:

BRUCE LEHMAN

*Attesting Officer*    *Commissioner of Patents and Trademarks*